US009740322B2

(12) United States Patent
Sekiguchi

(10) Patent No.: US 9,740,322 B2
(45) Date of Patent: *Aug. 22, 2017

(54) TOUCH PANEL AND LIQUID CRYSTAL DISPLAY DEVICE HAVING THE TOUCH PANEL

(71) Applicant: Japan Display Inc., Tokyo (JP)

(72) Inventor: Shinji Sekiguchi, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/265,923

(22) Filed: Sep. 15, 2016

(65) Prior Publication Data

US 2017/0003788 A1    Jan. 5, 2017

Related U.S. Application Data

(63) Continuation of application No. 14/454,814, filed on Aug. 8, 2014, now Pat. No. 9,471,166.

(30) Foreign Application Priority Data

Aug. 9, 2013    (JP) .................................. 2013-165819

(51) Int. Cl.
   *G06F 3/041*    (2006.01)
   *G06F 3/044*    (2006.01)
   (Continued)

(52) U.S. Cl.
   CPC ........ *G06F 3/0412* (2013.01); *G02F 1/13338* (2013.01); *G06F 3/044* (2013.01);
   (Continued)

(58) Field of Classification Search
   CPC .................................................... G06F 3/0412
   See application file for complete search history.

(56) References Cited

U.S. PATENT DOCUMENTS

2011/0291966 A1    12/2011    Takao et al.
2012/0062250 A1    3/2012    Kuo
(Continued)

FOREIGN PATENT DOCUMENTS

JP    2011-248722 A    12/2011
JP    2013-012016 A    1/2013
(Continued)

OTHER PUBLICATIONS

Japanese Office Action of Jun. 20, 2017 for corresponding Japanese Patent Application No. 2013-165819 with partial translation.

*Primary Examiner* — Viet Pham
(74) *Attorney, Agent, or Firm* — Typha IP LLC

(57) ABSTRACT

A touch panel includes plural scanning electrodes, plural detection electrodes that are formed to intersect with the plural scanning electrodes, one or a plurality of layers being disposed between the plural detection electrodes and the plural scanning electrodes, plural holes that are arrayed apart from each other on each of the plural detection electrodes, and shaped into polygons each shaped to have five or more corners in a plan view, and plural dummy electrodes that are formed between the respective adjacent detection electrodes, made of the same material as that of the detection electrode, and electrically isolated from each other, in which the plural dummy electrodes are shaped into the polygons in a plan view.

14 Claims, 12 Drawing Sheets

(51) Int. Cl.
G02F 1/1333 (2006.01)
G02F 1/1343 (2006.01)
G02F 1/1368 (2006.01)
G02F 1/1362 (2006.01)

(52) U.S. Cl.
CPC ........ *G02F 1/1368* (2013.01); *G02F 1/13439* (2013.01); *G02F 1/133345* (2013.01); *G02F 1/134363* (2013.01); *G02F 2001/136218* (2013.01); *G02F 2201/123* (2013.01); *G06F 2203/04102* (2013.01); *G06F 2203/04103* (2013.01); *G06F 2203/04107* (2013.01)

(56) References Cited

U.S. PATENT DOCUMENTS

| | | |
|---|---|---|
| 2012/0228110 A1 | 9/2012 | Takahashi et al. |
| 2013/0069069 A1 | 3/2013 | Koo et al. |
| 2013/0093706 A1 | 4/2013 | Kurasawa et al. |
| 2014/0063370 A1 | 3/2014 | Ko et al. |

FOREIGN PATENT DOCUMENTS

| | | |
|---|---|---|
| JP | 2013-088932 A | 5/2013 |
| JP | 2013-152579 A | 8/2013 |

FIG.11
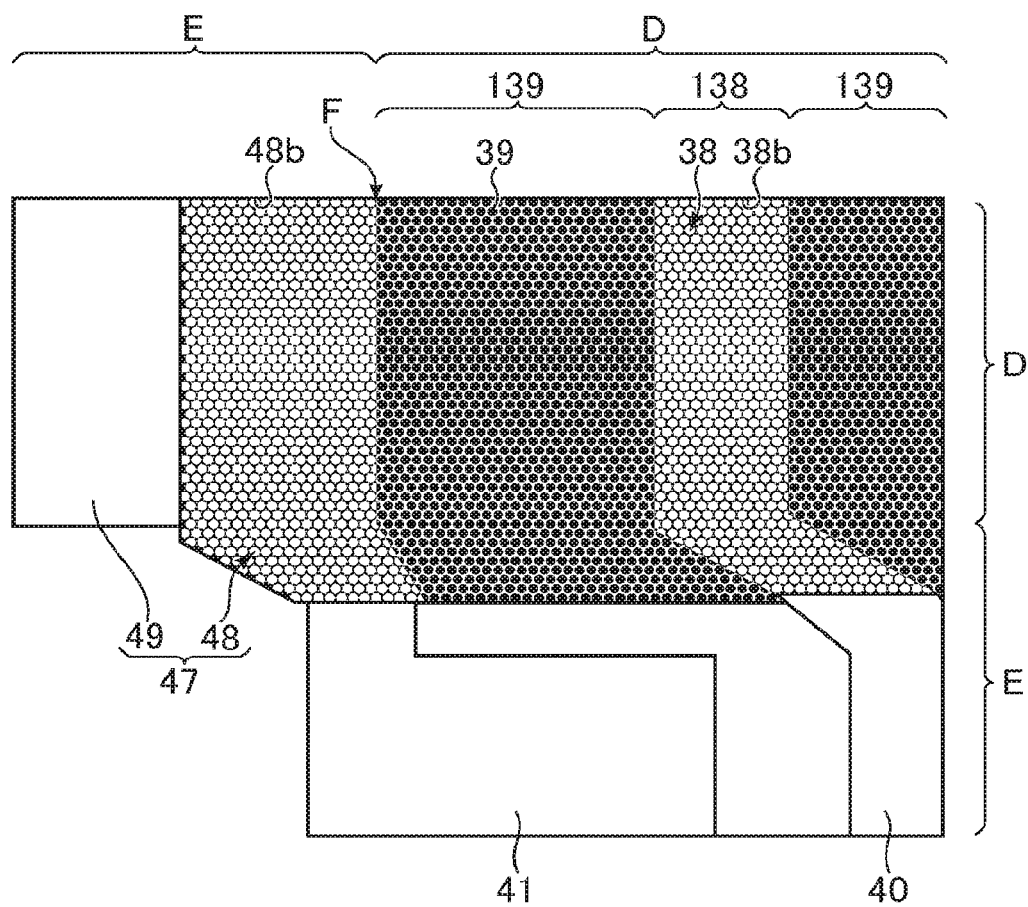
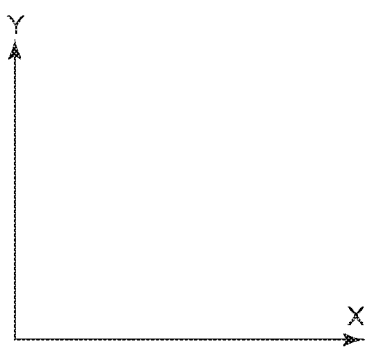

TOUCH PANEL AND LIQUID CRYSTAL DISPLAY DEVICE HAVING THE TOUCH PANEL

CROSS-REFERENCE TO RELATED APPLICATION

This application is a continuation of U.S. patent application Ser. No. 14/454,814, filed on Aug. 8, 2014. Further, this application claims priority from Japanese Patent Application JP2013-165819 filed on Aug. 9, 2013, the contents of which are hereby incorporated by reference into this application.

BACKGROUND OF THE INVENTION

1. Field of the Invention

The present invention relates to a touch panel and a display device having the touch panel.

2. Description of the Related Art

In recent years, a touch panel that detects a position which is touched with a finger, a dedicated pen or the like has been developed. As the touch panel of this type, for example, a capacitance type touch sensor has been known which detects a change in capacitance of a portion that is subjected to a touch pressing operation (hereinafter referred to as "touch"). In a touch panel of an in-cell touch panel in which common electrodes in a liquid crystal display panel of an IPS (In-Plane Switching) system are used as scanning electrodes for touch detection, the scanning electrodes, and detection electrodes that intersect with the scanning electrodes are arranged in a matrix.

JP 2011-248722 A discloses a touch panel having diamond lattice-shaped detection electrodes in which plural conductor lines lined up in parallel intersect with each other at a given angle. In the touch panel of this type, first electrodes which are the scanning electrodes, and second electrodes which are the detection electrodes intersect with each other at a given angle so that conductor lines forming the first electrodes and the second electrodes configure square mesh patterns in a plan view.

SUMMARY OF THE INVENTION

In the touch panel disclosed in JP 2011-248722 A, because the plural conductor lines are lined up in parallel, side surfaces of the plural conductor lines reflect light in the same direction due to light emission from pixels. As a result, the pattern of the detection electrodes is visible from an outside of the display device. Also, in the display device disclosed in JP 2011-248722 A, because the square mesh patterns are successively adjacent to each other, interference fringes (hereinafter referred to as "moiré") in which halftone dots that are fine patterns successively appear cannot be prevented. This results in a risk that the visibility of an image to be displayed through the touch panel is deteriorated.

The present invention has been made in view of the above circumstances, and therefore aims at preventing the visibility of the image displayed through the touch panel from being deteriorated.

(1) According to the present invention, there is provided a touch panel, including: a plurality of scanning electrodes; a plurality of detection electrodes that are formed to intersect with the plurality of scanning electrodes, one or a plurality of layers being disposed between the plurality of detection electrodes and the plurality of scanning electrodes, a plurality of holes that are arrayed apart from each other on each of the plurality of detection electrodes, and shaped into polygons each shaped to have five or more corners in a plan view; and a plurality of dummy electrodes that are formed between the respective adjacent detection electrodes, made of the same material as that of the detection electrode, and electrically isolated from each other, in which the plurality of dummy electrodes are shaped into the polygons in a plan view.

(2) According to the present invention, in the touch panel according to the item (1), the plurality of holes shaped into the polygons and arrayed on the detection electrodes, and the plurality of dummy electrodes may form a uniform contiguous array.

(3) According to the present invention, in the touch panel according to the item (1) or (2), the planar view shape of the polygons may be viewed as a circle by increasing the number of corners.

(4) According to the present invention, in the touch panel according to any one of the items (1) to (3), in a detection electrode formation area in which the detection electrodes are formed, a ratio of an area of the plurality of holes to an area of the detection electrodes may be equal to or larger than ⅔ and equal to or smaller than 3/2.

(5) According to the present invention, in the touch panel according to any one of the items (1) to (4), distances between centers of the respective adjacent polygons may be equal to each other.

(6) According to the present invention, the touch panel according to any one of the items (1) to (5), may further include a shield electrode which is an electrode in which the plurality of holes shaped into the polygons are formed outside of a display area in which the detection electrodes are formed.

(7) According to the present invention, there may be provided a liquid crystal display device, including: the touch panel according to any one of the items (1) to (6); pixel electrodes that form an electric field with the scanning electrodes as counter electrodes; and liquid crystal having an orientation controlled by the electric field.

(8) Also, according to the present invention, there is provided a touch panel, including: a plurality of scanning electrodes; a plurality of detection electrodes that are formed to intersect with the plurality of scanning electrodes, one or a plurality of layers being disposed between the plurality of detection electrodes and the plurality of scanning electrodes, a plurality of holes that are arrayed apart from each other on each of the detection electrodes, and shaped into polygons each shaped to have five or more corners in a plan view; and a plurality of dummy electrodes that are formed between the respective adjacent detection electrodes, made of the same material as that of the detection electrode, and electrically isolated from each other, in which the plurality of dummy electrodes are shaped into polygons each having five or more corners in a plan view.

According to the present invention, as compared with the touch panel or the liquid crystal display device which does not provide the above configurations, the reflection of light and the generation of moiré on the polygonal holes in the detection electrodes and the side surfaces of the dummy electrodes are suppressed. For that reason, the prevention of the visibility of the image displayed through the touch panel from being deteriorated can be realized.

BRIEF DESCRIPTION OF THE DRAWINGS

FIG. 11 is a partially enlarged view of an area XI in the touch panel illustrated in FIG. 1.

DETAILED DESCRIPTION OF THE INVENTION

Hereinafter, a touch panel and a display device according to this embodiment will be described with the example of a liquid crystal display device 1 with reference to the accompanying drawings. For facilitation of understanding the characteristics, the drawings referred to in the following description may illustrate characteristic portions in an enlarged manner for convenience, and size ratios of the respective components are not always identical with actual size ratios. Also, materials and the like exemplified in the following description are exemplary, and the respective components may be made of materials different from the exemplary materials, and can be changed without departure from the spirit thereof.

Figure 1:
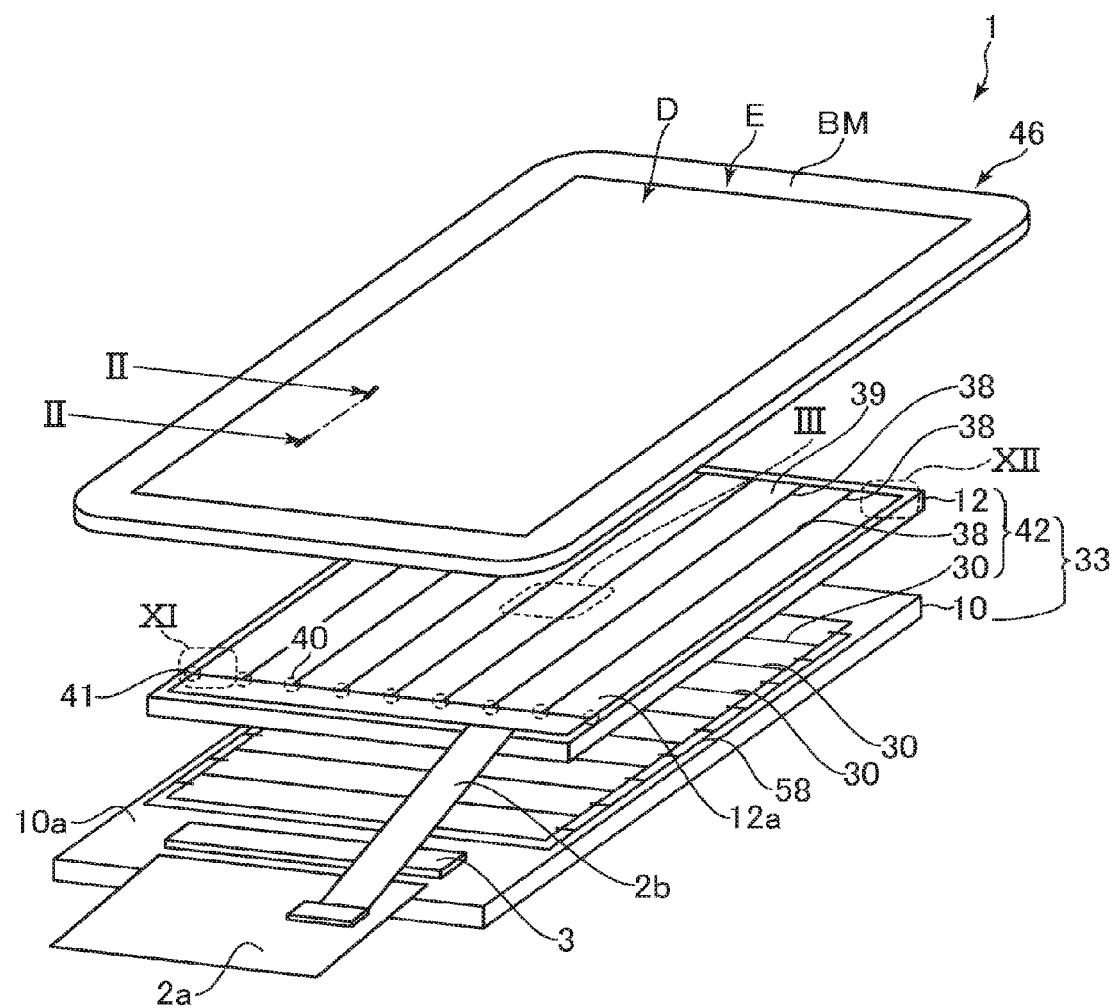
FIG. 1 is an exploded perspective view of a liquid crystal display device having a touch panel according to an embodiment of the present invention.

FIG. 1 is an exploded perspective view of the liquid crystal display device 1 having a touch panel according to an embodiment of the present invention. As illustrated in FIG. 1, the liquid crystal display device 1 includes a liquid crystal display panel 33, and a front panel 46 having a display area D and a non-display area E. For convenience of description, a partial configuration of the liquid crystal display device 1 is omitted from FIG. 1.

The liquid crystal display panel 33 is, for example, a liquid crystal display panel of an IPS (In-Plane Switching) system, and includes a first substrate 10 and a touch panel 42. An area corresponding to the non-display area E on an upper surface 10a of the first substrate 10 is connected with a first flexible circuit board 2a, and also provided with a driver IC (integrated circuit) 3. The driver IC 3 is arranged on an upper side of the first substrate 10 for receiving image data from an external of the liquid crystal display device 1 through the first flexible circuit board 2a. The driver IC 3 receives image data, and supplies a voltage signal to be applied to scanning electrodes (counter electrodes) and pixel electrodes 34 to be described later through common wiring 58 for respective pixels.

The touch panel 42 includes the plural scanning electrodes 30, a second substrate 12, and plural detection electrodes 38. The scanning electrodes 30 are disposed to extend at intervals from each other in a direction X in an area corresponding to the display area D on the upper surface 10a of the first substrate 10. Also, the plural scanning electrodes 30 and the plural detection electrodes 38 extend to intersect with each other through one or a plurality of layers.

The second substrate 12 is arranged over an upper side of the first substrate 10. In an area corresponding to the display area D on an upper surface 12a of the second substrate 12, for example, the plural detection electrodes 38 extending in a direction Y are disposed at intervals from each other. The direction Y has only to intersect with a direction X, but it is preferable that the direction Y is orthogonal to the direction X.

Respective ends of the plural detection electrodes 38 formed in the area corresponding to the display area D in the direction Y are connected to terminals 40, and an end of the detection electrode 38 formed in the area corresponding to the non-display area E in the direction Y is connected to a shield terminal 41. Also, dummy electrodes 39 are formed between the respective adjacent detection electrodes 38. The detailed configurations of the detection electrodes 38 and the dummy electrodes 39 will be described later.

The area corresponding to the non-display area E on the upper surface 12a of the second substrate 12 is connected with a second flexible circuit board 2b. The second flexible circuit board 2b is disposed for electric connection between the detection electrodes 38 and an external device, and a part of the second flexible circuit board 2b is connected to the first flexible circuit board 2a.

The front panel 46 is arranged on an upper side of the second substrate 12. The front panel 46 is a member for protecting the liquid crystal display panel 33. The display area D of the front panel 46 has a translucency, and a lower surface of the non-display area E is covered with a black matrix BM.

Figure 2:
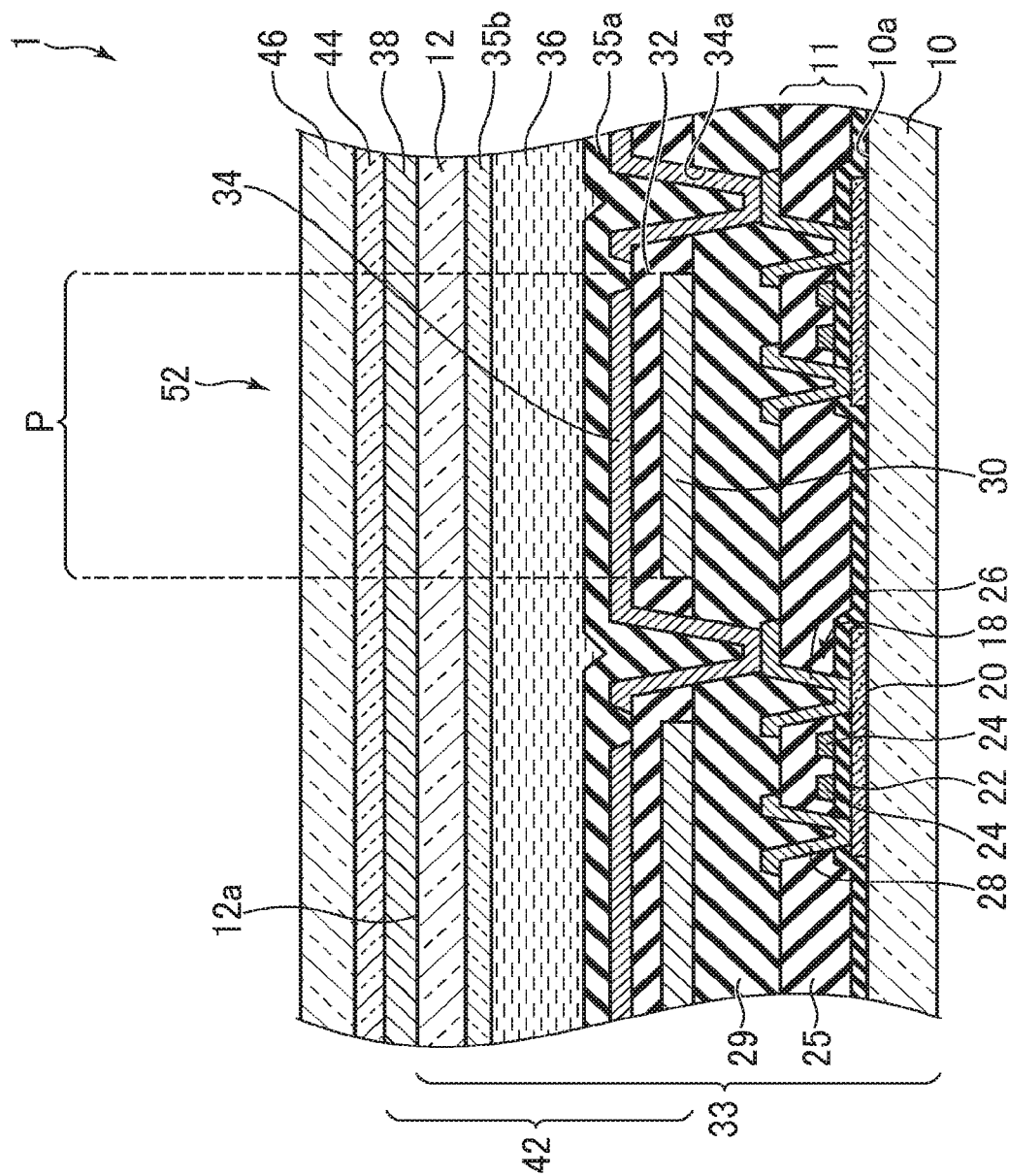
FIG. 2 is a schematic cross-sectional view taken along a line II-II of the liquid crystal display device illustrated in FIG. 1.

Subsequently, a configuration of the display area D in the liquid crystal display device 1 will be described in detail. FIG. 2 is a schematic cross-sectional view taken along a line 11-11 of the liquid crystal display device 1 illustrated in FIG. 1.

The first substrate 10 is an insulating substrate made of, for example, glass, and a circuit layer 11, the scanning electrodes 30, and the pixel electrodes 34 are formed on the upper surface 10a of the first substrate 10 in the stated order.

The circuit layer 11 is a layer on which thin film transistors 18, a first insulating film (gate insulating film) 22, and electric wiring not shown are formed, and disposed to drive the pixel electrodes 34. The thin film transistors 18 are disposed on the first substrate 10 for respective pixels P. Each of the thin film transistors 18 includes, for example, a polysilicon semiconductor layer 20, the first insulating film 22, a gate electrode 24, a second insulating film 25, a source electrode 26, and a drain electrode 28.

An upper side of the thin film transistor 18 is covered with a third insulating film (flattening film) 29. The flattening film 29 is a layer made of an insulating material, and formed between the first substrate 10 and the pixel electrodes 34, to thereby electrically isolate between the adjacent thin film transistors 18 or between the thin film transistors 18 and the pixel electrodes 34.

The scanning electrodes 30 are formed over the flattening film 29, and the pixel electrodes 34 are formed over upper sides of the scanning electrodes 30 through a fourth insulating film 32. The pixel electrodes 34 are electrodes formed for the respective pixels P for the purpose of driving liquid crystal 36 which will be described later. In this embodiment, the pixel electrodes 34 are located closer to the second substrate 12 side than the scanning electrodes 30. However, the positional relationship may be reversed. The pixel electrodes 34 are connected to the thin film transistor 18 through contact holes 34*a*.

The second substrate 12 is arranged over the pixel electrodes 34 through a first oriented film 35*a*, the liquid crystal 36, and a second oriented film 35*b*. With the above configuration, the pixel electrodes 34 each form an electric field in cooperation with the corresponding scanning electrode 30 as the counter electrode. An orientation of the liquid crystal 36 is controlled by an electric field generated between the scanning electrodes 30 and the pixel electrodes 34.

The second substrate 12 is, for example, a color filter substrate, and has a color filter or a black matrix not shown formed thereon. The detection electrodes 38 and the dummy electrodes 39 that will be described later are formed over the second substrate 12, and the front panel 46 is stuck on the detection electrodes 38 and the dummy electrodes 39 through an adhesion layer 44.

Figure 3:
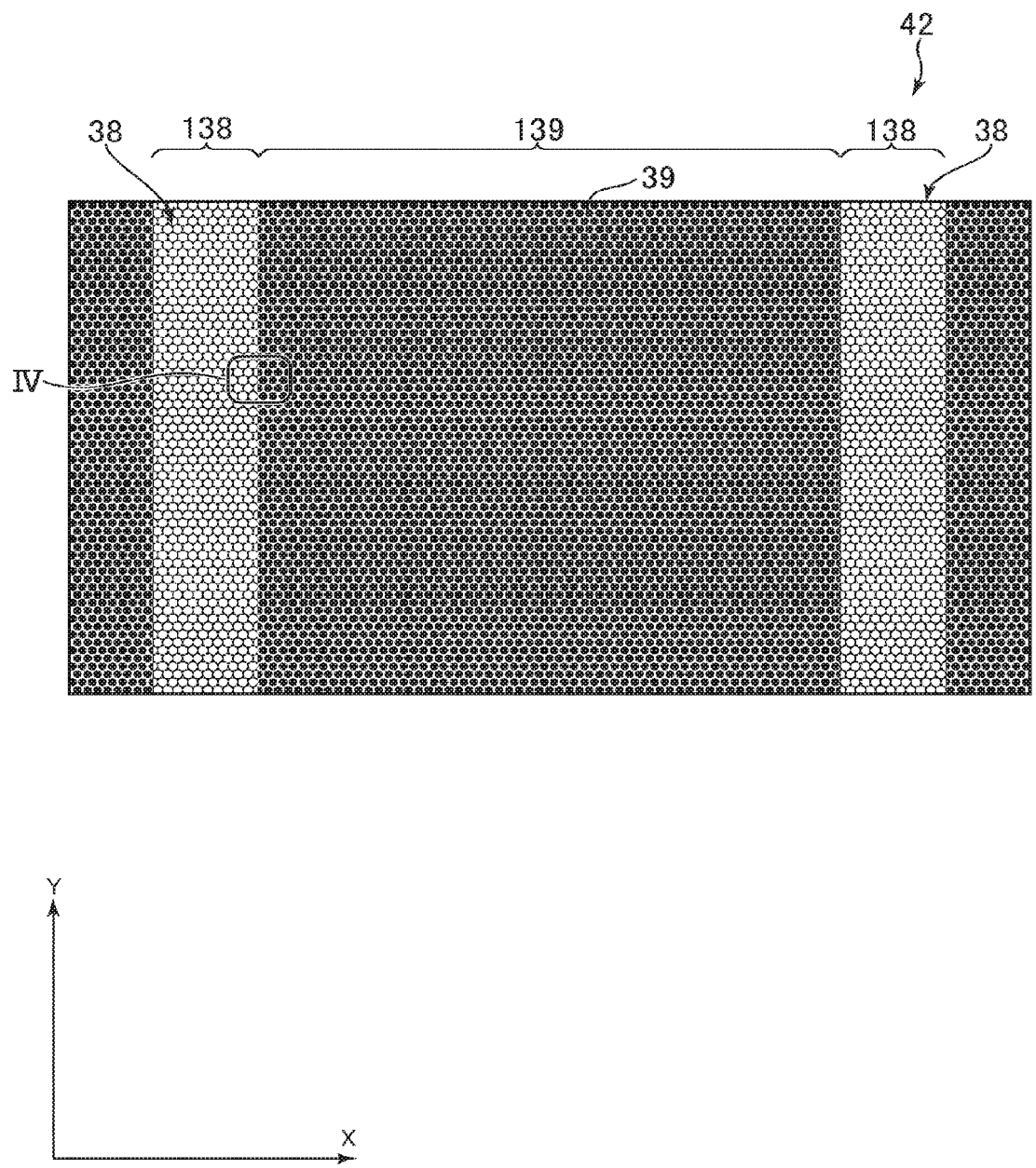
FIG. 3 is a partially enlarged view of an area III of the touch panel illustrated in FIG. 1.

Hereinafter, a configuration of the detection electrodes 38 and the dummy electrodes 39 will be described in detail. FIG. 3 is a partially enlarged view of an area III of the touch panel 42 illustrated in FIG. 1. For convenience of description, illustrations other than the detection electrodes 38 and the dummy electrodes 39 are omitted in FIG. 3. The detection electrodes 38 are electrodes for detecting whether the front panel 46 is touched from the external, or not based on the difference of capacitance between the detection electrodes 38 and the scanning electrodes 30.

If areas in which the detection electrodes 38 are formed are detection electrode formation areas 138, the detection electrodes 38 (the detection electrode formation areas 138) extend in the direction Y, and the plural detection electrodes 38 adjacent to each other in the direction X are aligned at intervals from each other. Also, the detection electrodes 38 are made of, for example, a translucent conductive material such as ITO (indium tin oxide).

The plural dummy electrodes 39 are electrodes which are formed between the respective adjacent detection electrodes 38, made of the same material of the detection electrodes 38, and electrically isolated from each other. When an area in which the plural dummy electrodes 39 are formed between the respective detection electrodes 38 is a dummy electrode formation area 139, the dummy electrode formation area 139 extends in the direction Y, and fills a space between the respective adjacent detection electrodes 38.

Figure 4:
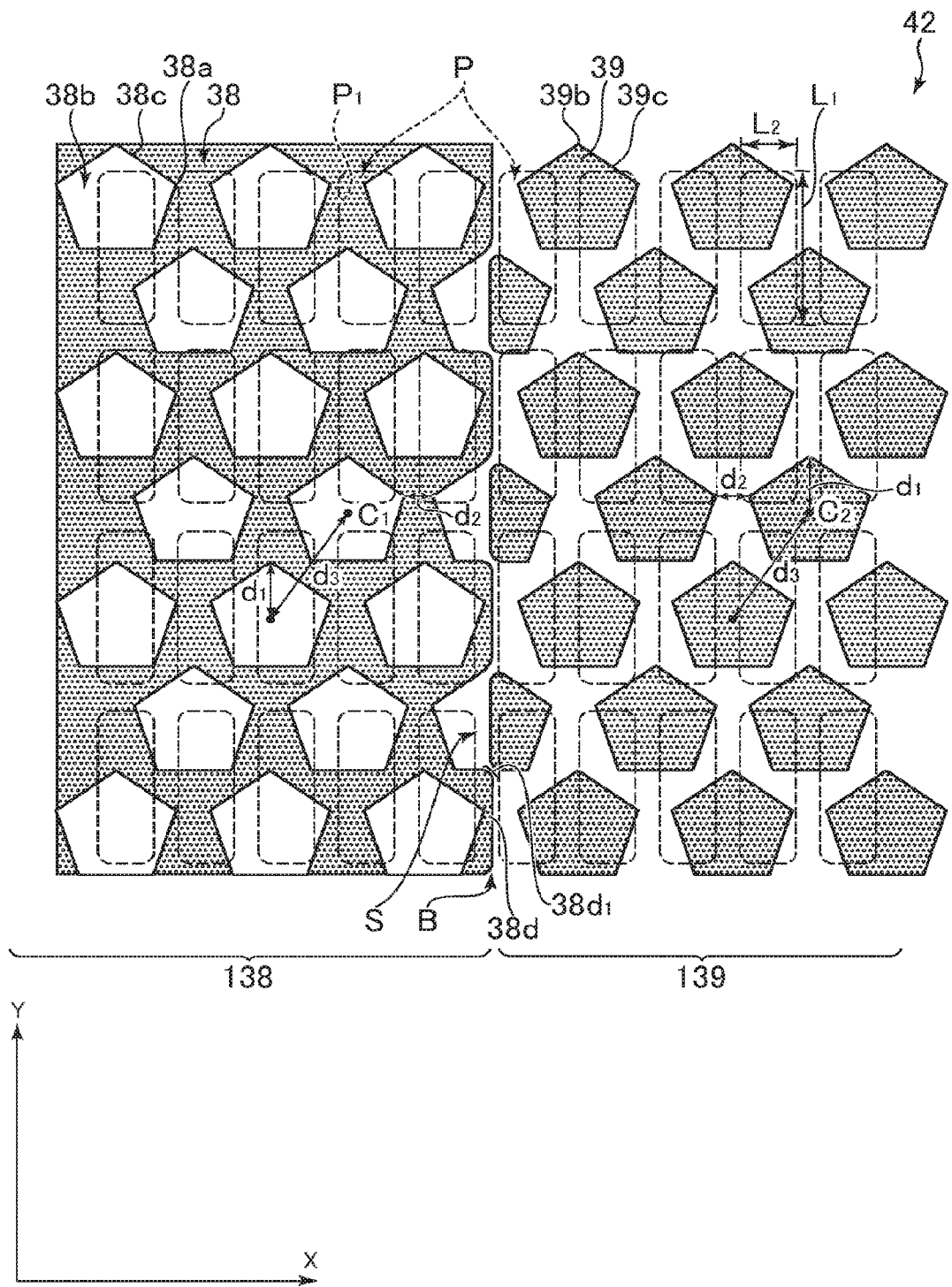
FIG. 4 is a partially enlarged view of an area IV of the touch panel illustrated in FIG. 3.

FIG. 4 is a partially enlarged view of an area IV of the touch panel 42 illustrated in FIG. 3. For convenience of description, illustrations other than the detection electrodes 38, the dummy electrodes 39, and the pixels P are omitted in FIG. 4. As illustrated in FIG. 4, in the detection electrodes 38, plural pentagonal holes 38*b* each shaped to have five corners 38*a* in a plan view are arrayed at intervals from each other. The respective holes 38*b* are arrayed at given intervals and pitches in a zigzag pattern, and arrayed regularly so that distances between a center of one hole 38*b* and respective centers of six holes 38*b* adjacent to one hole 38*b* are identical with each other. The number of corners 38*a* has only to be five or more, and the holes 38*b* are each formed into a polygonal shape having five or more corners 38*a* in a plan view. With the above configuration, at least a part of respective sides 38*c* of the holes 38*b* is not arrayed in parallel to an outer periphery P$_1$ of the pixel P which is formed into a rectangular shape in a plan view, and extends in a direction intersecting with the outer periphery P$_1$.

The respective shapes of the plural dummy electrodes 39 formed in the dummy electrode formation area 139 have the same polygonal shape as that of the holes 38*b* in the detection electrodes 38. Specifically, the dummy electrodes 39 each have five corners 39*b* and five sides 39*c* as with the holes 38*b*. The "same polygonal shape" in this embodiment includes not only the completely identical polygonal shape, but also a shape deviated from the identical shape within the margin of error due to a manufacturing process.

As compared with the touch panel or the liquid crystal display device having the detection electrodes in which rectangular holes or grooved holes are formed, in the touch panel 42 and the liquid crystal display device 1 configured as described above in this embodiment, the respective sides 38*c* of the holes 38*b* of the detection electrodes 38 and the outer periphery P$_1$ of the pixels P, and the respective sides 39*c* of the dummy electrodes 39 and the outer periphery P$_1$ of the pixels P are prevented from being arranged in parallel to each other.

For that reason, as compared with the touch panel and the liquid crystal display device with no provision of the above configuration, the light emission from the pixels P is prevented from being reflected from the respective sides 38*c* of the detection electrodes 38 and the respective sides 39*c* of the dummy electrodes 39, and advancing in the same direction. As a result, the patterns of the detection electrodes 38 and the dummy electrodes 39 are prevented from being visible from the outside of the touch panel 42. Also, because the respective sides 38*c* of the detection electrodes 38 and the respective sides 39*c* of the dummy electrodes 39 are prevented from being successively arranged in parallel to each other, the generation of moiré can be suppressed.

With the above configuration, the touch panel 42 and the liquid crystal display device 1 according to this embodiment can realize the prevention of the visibility of the image displayed through the touch panel 42 from being deteriorated.

Also, because the shape of the holes 38*b* of the detection electrodes 38 are polygonal in the plan view, the light reflected on the side surfaces of the holes 38*b* is prevented from being focused on one point. For that reason, a difference in the visibility between the detection electrodes 38 and the dummy electrode formation area 139 is suppressed.

It is preferable that the detection electrodes 38 and the dummy electrodes 39 are formed through photolithography. When the detection electrodes 38 and the dummy electrodes 39 are formed by photolithography, the pattern becomes higher in definition, and the above-mentioned effects can be further obtained.

It is preferable that a radius $d_1$ (radius $d_1$, of the dummy electrodes 39) of the holes 38*b* of the detection electrodes 38 is equal to or larger than 5 μm, and equal to or smaller than 250 μm. When the radius d: is equal to or larger than 5 μm, and equal to or smaller than 250 μm, the holes 38*b* of the detection electrodes 38 and the dummy electrodes 39 are prevented from being viewed, and a precision of the shapes of the holes 38*b* and the dummy electrodes 39 in the plan view can be kept.

Also, it is preferable that a distance $d_2$ (a distance $d_2$ between the respective adjacent dummy electrodes 39) between holes 38*b* of the respective adjacent detection electrodes 38 is formed with a size within a processable range and a size preventing the visibility. Specifically, it is preferable that the distance $d_2$ is equal to or larger than 5 µm, and equal to or smaller than 250 µm. When the distance $d_2$ is equal to or larger than 5 µm, and equal to or smaller than 250 µm, the visibility of the holes 38b of the detection electrodes 38 and the dummy electrodes 39 can be prevented, and an electric resistance of the detection electrodes 38 can be suppressed.

Also, it is preferable that the distance $d_2$ (distance $d_2$ between the respective adjacent dummy electrodes 39) between the holes 38b of the respective adjacent detection electrodes 38, and a length $L_1$ of long sides and a length $L_2$ of short sides of the pixels P in the plan view are different from each other. Since the touch panel 42 and the liquid crystal display device 1 according to this embodiment have the above configuration, positional relationships between the respective sides 38c of the holes 38b and the outer periphery $P_1$ of the pixels P, and between the respective sides 39c of the dummy electrodes 39 and the outer periphery $P_1$ of the pixels P suppress the generation of moiré.

Also, it is preferable that the plural holes 38b of the detection electrodes 38, and the plural dummy electrodes 39 have a uniform contiguous array. Specifically, if a boundary between the detection electrode formation areas 138 and the dummy electrode formation area 139 is a boundary B, shapes S formed by the holes 38b and the dummy electrodes 39 adjacent to each other across the boundary B have the same polygonal shape as that of the holes 38b and the dummy electrodes 39 in the plan view. Specifically, on the boundary B, a shape of each detection electrode 38 corresponding to a part (specifically, substantially half thereof) of the hole 38b, and the dummy electrode 39 of a shape corresponding to the remaining part of the hole 38b are arranged in a complementary manner to arrange a boundary structure (shape S).

With the above configuration, the polygonal shapes in the plan view which are configured by the holes 38b and the dummy electrodes 39, are contiguously and uniformly arrayed from the detection electrode formation areas 138 to the dummy electrode formation area 139 (The shapes S, the holes 38b, and the dummy electrodes 39 are arrayed at pitches common to each other, and array pitches of the polygonal shape in the plan view are maintained by the shapes S.) With the provision of this configuration, as illustrated in FIG. 4, an outer periphery 38d of each detection electrode 38 on the dummy electrode 39 side is not linear, and a part of the outer periphery 38d configures the shape S.

Since the touch panel 42 and the liquid crystal display device 1 according to this embodiment have the above configuration, light from the pixels P is prevented from being reflected in one direction in the outer periphery 38d of the detection electrodes 38. For that reason, the visibility of the boundary B can be prevented.

Also, it is preferable that an area $38d_1$ extending from the boundary B toward each hole 38b in the outer periphery 38d is curved. Since the curved area $38d_1$ is formed in the outer periphery 38d, an interference of light in the outer periphery 38d is suppressed. The area $38d_1$ can be curved by adjusting a condition of photolithography and an etching condition in the formation of the detection electrodes 38 and the dummy electrodes 39.

Also, it is preferable that a ratio of a total of areas of the plural holes 38b (including the part of the plural holes 38b of the boundary structure) to an area of the detection electrodes 38 is equal to or larger than ⅔, and equal to or smaller than 3/2 in the detection electrode formation areas 138. Also, it is further desirable that the area of the detection electrodes 38 in the detection electrode formation areas 138 is set to be equal to or larger than 0.9 times, and equal to or smaller than 1.1 times of the total area of the holes 38b formed in the detection electrodes 38.

To be more specific, the detection electrode formation areas 138 are configured by the detection electrodes 38 and the holes 38b, and if the ratio of the total of the areas of the plural holes 38b to the area of the detection electrodes 38 falls within the above range. As a result, the ratio of the area of the detection electrodes 38 and the holes 38b in the detection electrode formation areas 138 falls within a range of from 3:2 to 2:3.

Also, because the planar shape of the holes 38b is equal to the planar shape of the dummy electrodes 39, the ratio of the total of the areas of the dummy electrodes 39 to the area of the detection electrodes 38 per the same area is also equal to or larger than ⅔, and equal to or smaller than 3/2 with the provision of the above configuration.

With the above configuration, an area ratio of the detection electrodes 38 and the dummy electrodes 39 within the same area ranges within a given range from 1:1. As a result, in the touch panel 42 and the liquid crystal display device 1 according to this embodiment, a difference of the visibility is hardly generated as compared with the touch panel and the liquid crystal display device with no provision of the above configuration. For that reason, a difference in shading between the detection electrodes 38 and the dummy electrode formation area 139 is hardly visible, and the prevention of the visibility of the image displayed through the touch panel 42 from being deteriorated can be realized.

Also, it is preferable that if distances between centers $c_2$, of the respective adjacent holes 38b, and distances between centers $c_2$ of the respective adjacent dummy electrodes 39 are set to a distance $d_3$, the distance $d_3$ in the respective holes 38b is equal to the distance $d_3$ in the respective dummy electrodes 39.

With the above configuration, the holes 38b are arranged in each detection electrode 38 in a closest manner, and the dummy electrodes 39 are arranged in the dummy electrode formation area 139 in the closest manner. For that reason, in the touch panel 42 and the liquid crystal display device 1 according to this embodiment, the area of the detection electrodes 38, and the ratio of the dummy electrodes 39 to the dummy electrode formation area 139 are easily adjustable, as compared with the touch panel and the liquid crystal display device with no provision of the above configuration. Also, because the distances between the respective adjacent holes 38b are equal to each other, the electric resistance in the detection electrodes 38 can be suppressed.

Figure 5:
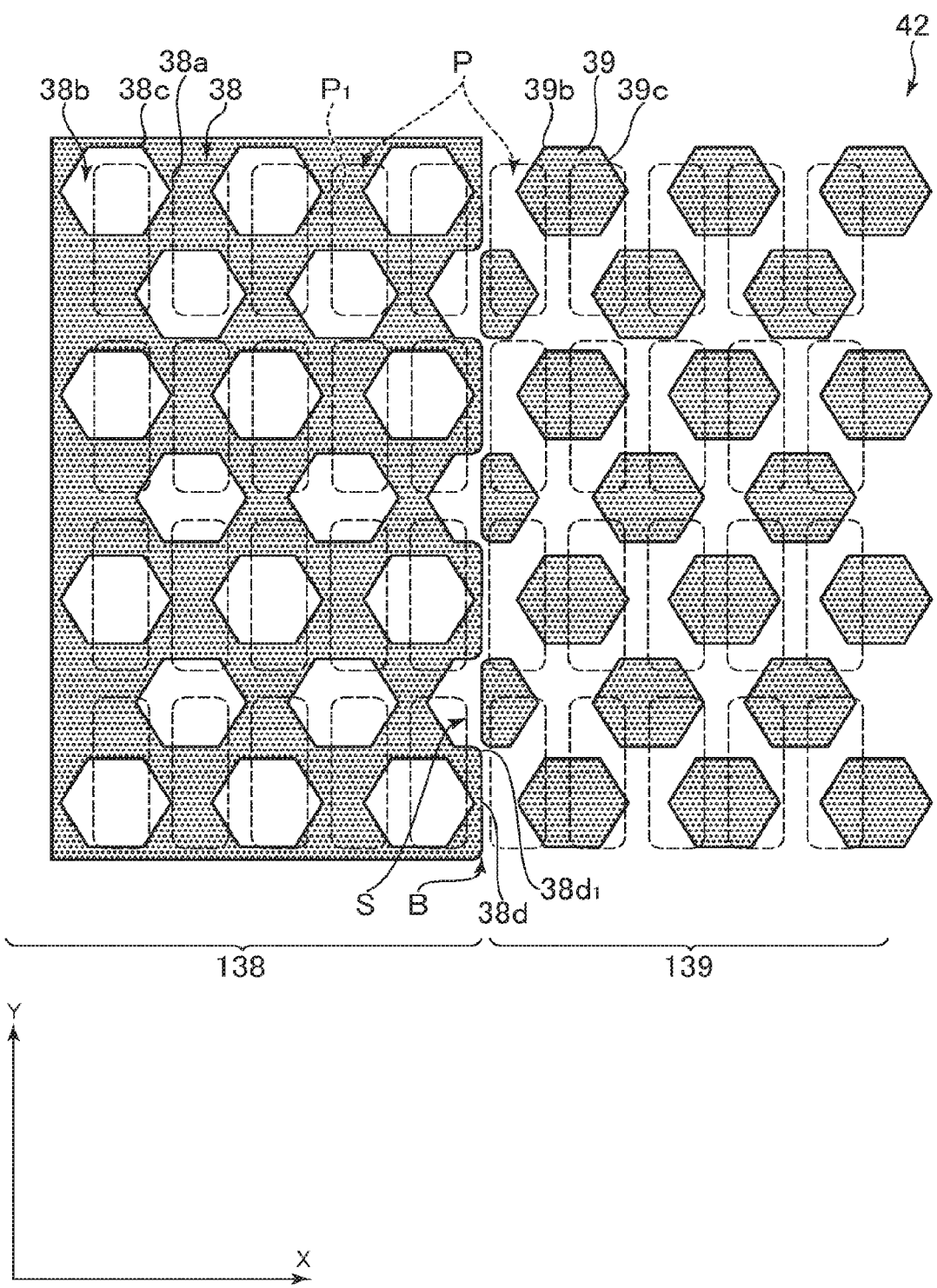
FIG. 5 is a partially enlarged view illustrating one modification of the touch panel according to this embodiment in the same viewing field as that in FIG. 4.

Hereinafter, modifications of the touch panel 42 according to this embodiment will be described. FIG. 5 is a partially enlarged view illustrating one modification of the touch panel 42 according to this embodiment in the same viewing field as that in FIG. 4. As illustrated in FIG. 5, the holes 38b may be each shaped into a hexagon having six corners 38a in a plan view. Likewise, the dummy electrodes 39 may be each shaped into a hexagon having six corners 39a. With the above configuration, at least four sides 38c of each hole 38b, and at least four sides 39c of each dummy electrode 39 are not arranged in parallel to the outer periphery $P_1$ of the pixels P, and extend in directions intersecting with the outer periphery $P_1$.

For that reason, in the touch panel 42 and the liquid crystal display device 1 according to this embodiment, the respective sides 38c of the holes 38b and the outer periphery $P_1$ of the pixels P, and the respective sides 39c of the dummy electrodes 39 and the outer periphery $P_1$ of the pixels P are prevented from being arranged in parallel to each other, as compared with the touch panel and the liquid crystal display device with no provision of the above configuration. For that reason, the generation of moiré is suppressed, and the prevention of the visibility of the image displayed through the touch panel 42 from being deteriorated can be realized.

Figure 6:
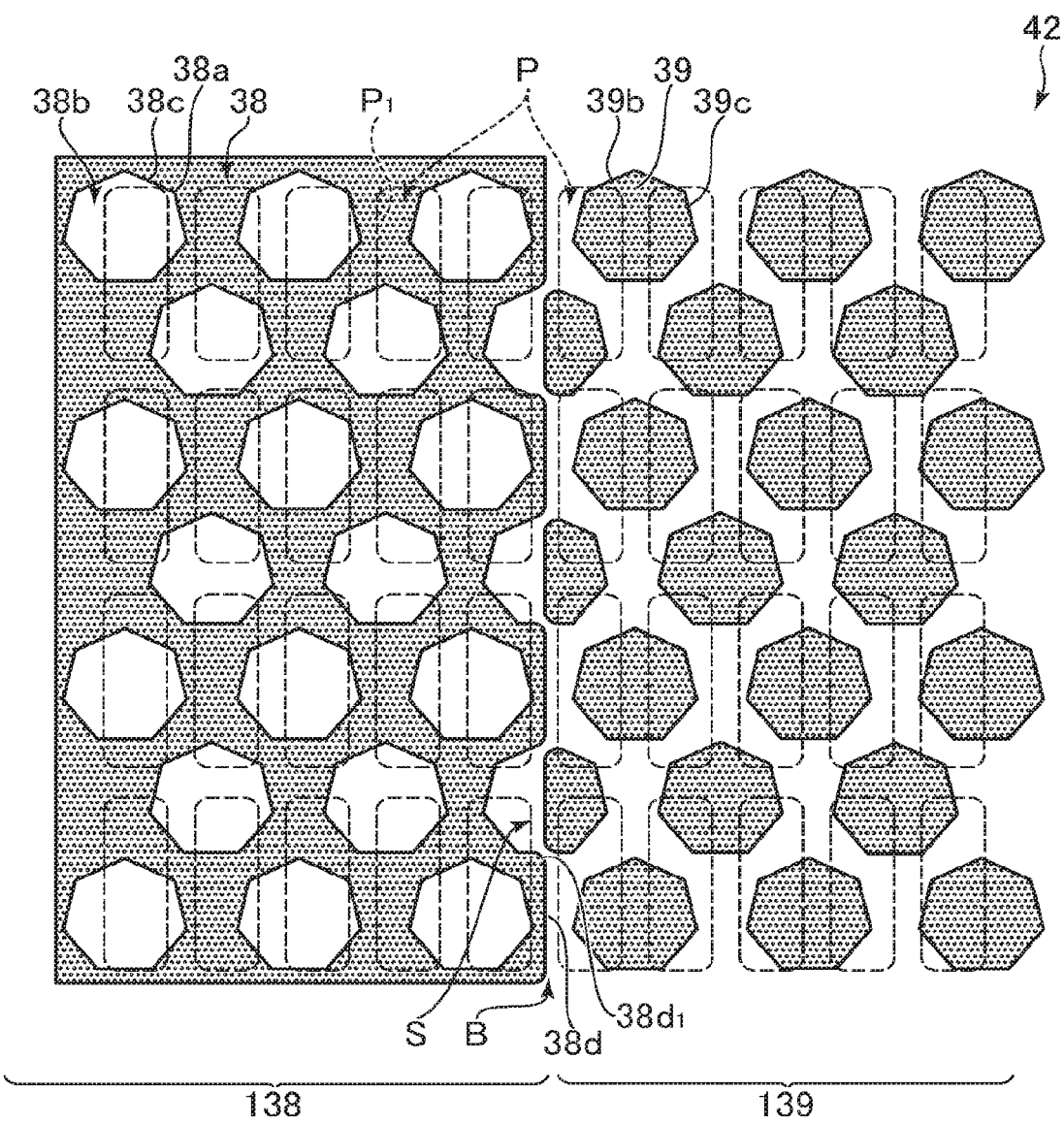
FIG. 6 is a partially enlarged view illustrating another modification of the touch panel according to this embodiment in the same viewing field as that in FIG. 4.

FIG. 6 is a partially enlarged view illustrating another modification of the touch panel 42 according to this embodiment in the same viewing field as that in FIG. 4. As illustrated in FIG. 6, the holes 38b and the dummy electrodes 39 may be shaped into heptagons having seven corners 38a and 39a, respectively. Since the holes 38b and the dummy electrodes 39 have the polygonal shapes having odd-numbered corners 38a and 39a in the plan view, the number of respective sides 38c of each hole 38b which are parallel to the outer periphery $P_1$ of the pixel P is at most one.

Likewise, the number of respective sides 39c of each dummy electrode 39 which are parallel to the outer periphery $P_1$, of the pixel P is at most one. For that reason, in the touch panel 42 and the liquid crystal display device 1 according to this embodiment, the generation of moiré is suppressed as compared with the touch panel and the liquid crystal display device with no provision of this configuration. As a result, the prevention of the visibility of the image displayed through the touch panel 42 from being deteriorated can be realized.

Figure 7:
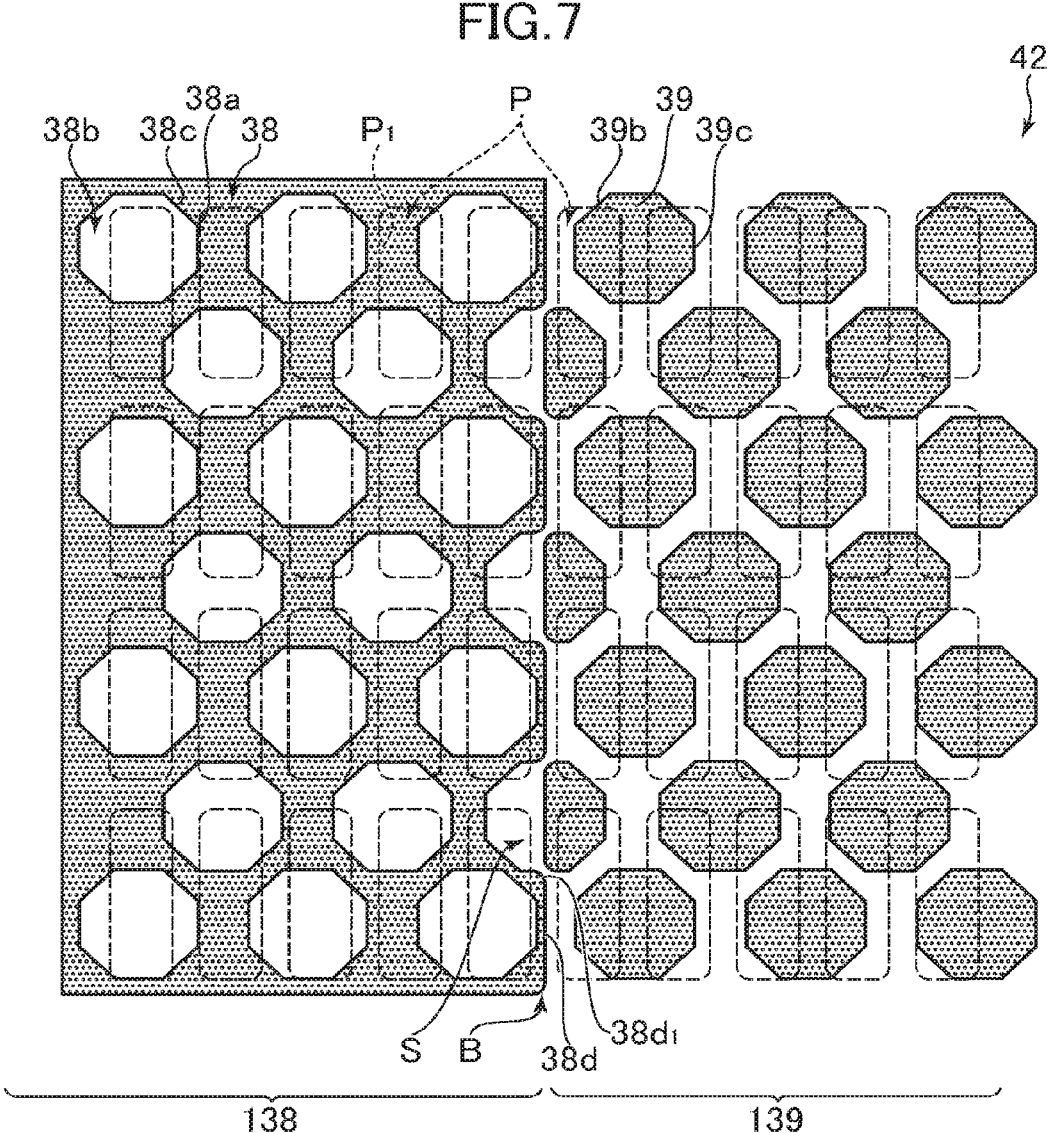
FIG. 7 is a partially enlarged view illustrating still another modification of the touch panel according to this embodiment in the same viewing field as that in FIG. 4.

FIG. 7 is a partially enlarged view illustrating still another modification of the touch panel 42 according to this embodiment in the same viewing field as that in FIG. 4. As illustrated in FIG. 7, the holes 38b and the dummy electrodes 39 may be shaped into octagons having eight corners 38a and 39a, respectively.

Figure 8:
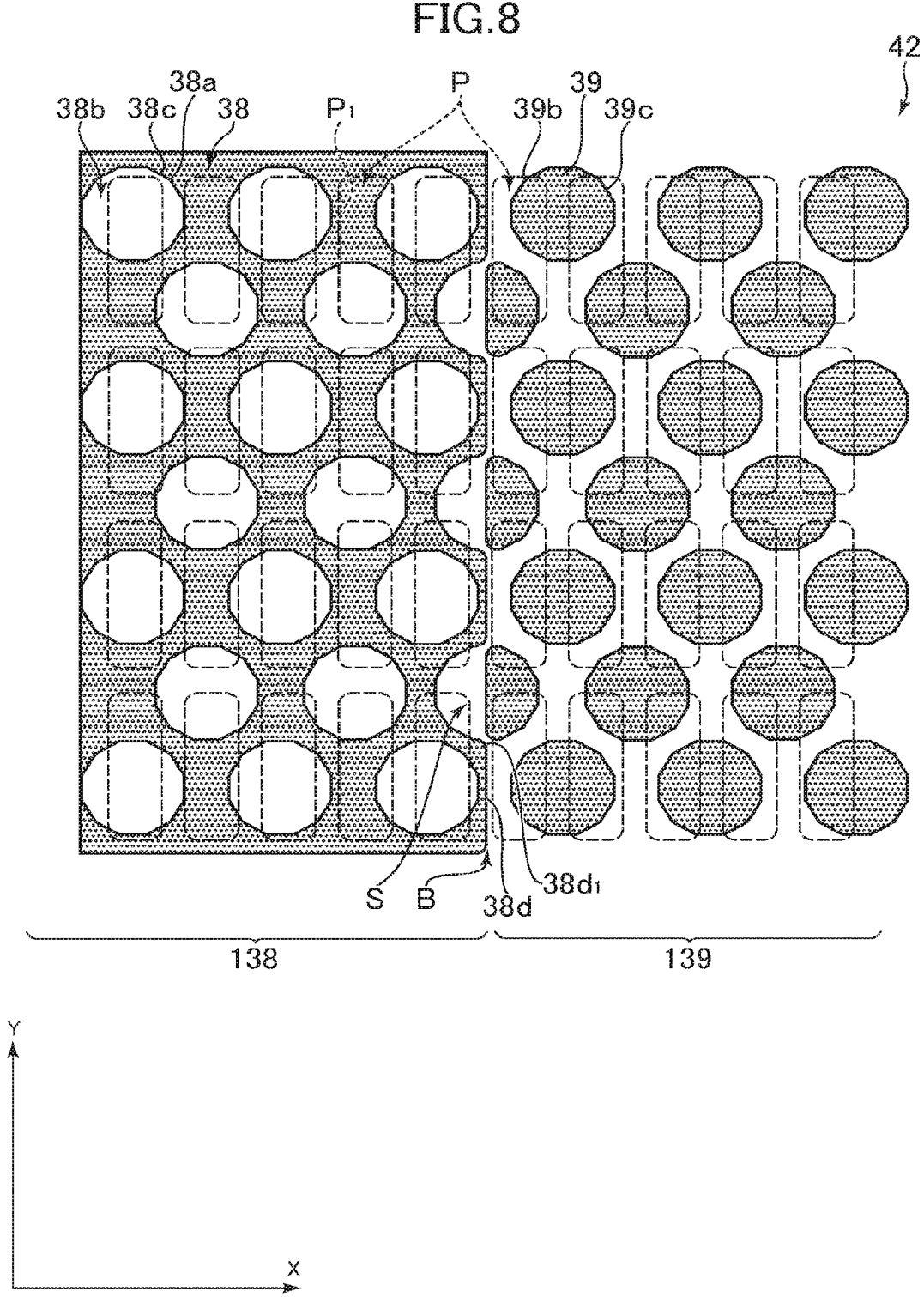
FIG. 8 is a partially enlarged view illustrating yet another modification of the touch panel according to this embodiment in the same viewing field as that in FIG. 4.

FIG. 8 is a partially enlarged view illustrating yet another modification of the touch panel 42 according to this embodiment in the same viewing field as that in FIG. 4. The holes 38b and the dummy electrodes 39 illustrated in FIG. 8 are shaped into dodecagons having 12 corners 38a and 39a, respectively. If the number of corners 38a and 39a is thus five or more, the number is not limited to the above example, and may increase more.

Figure 9:
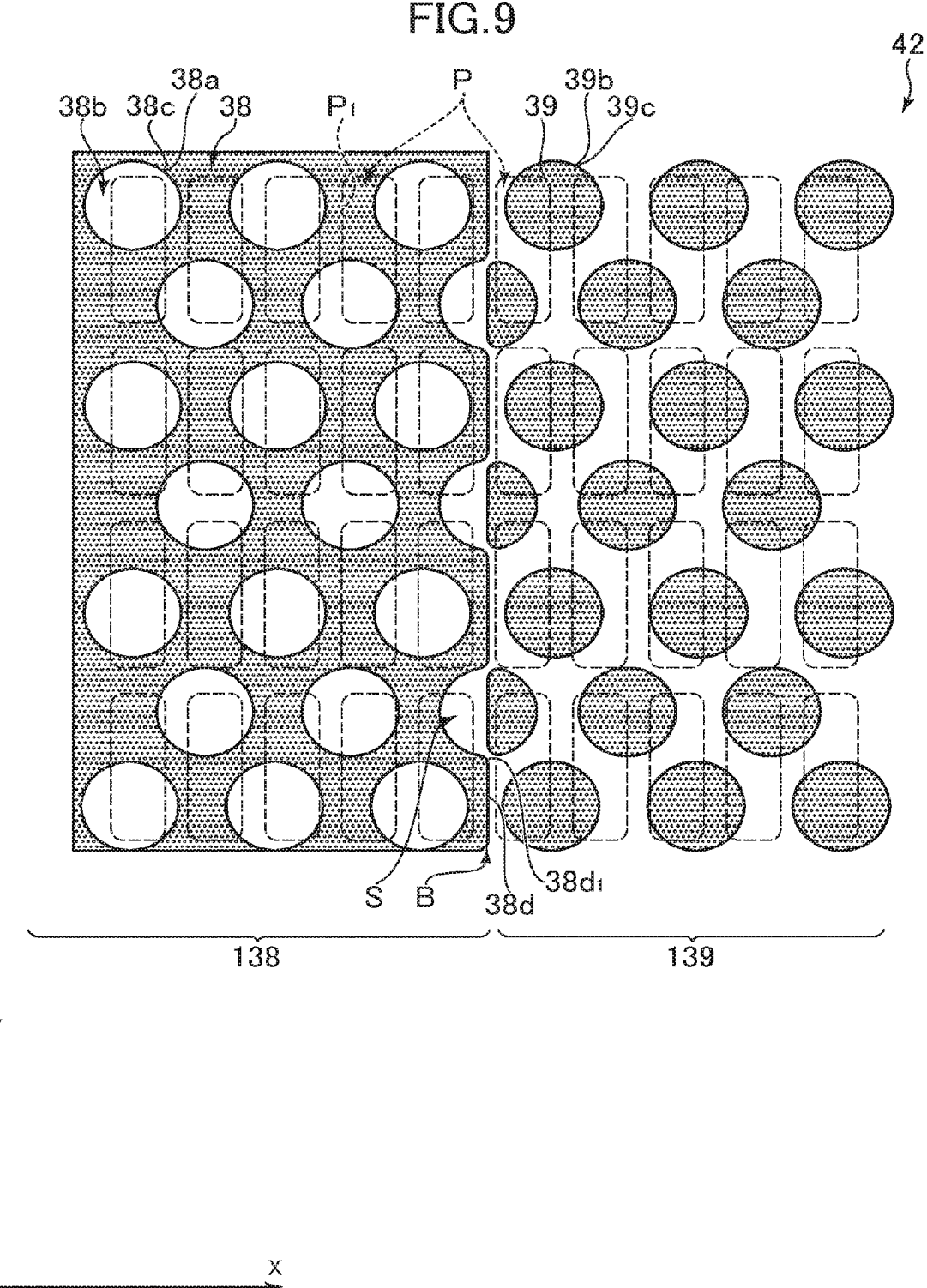
FIG. 9 is a partially enlarged view illustrating a further modification of the touch panel according to this embodiment in the same viewing field as that in FIG. 4.

FIG. 9 is a partially enlarged view illustrating a further modification of the touch panel 42 according to this embodiment in the same viewing field as that in FIG. 4. The holes 38b and the dummy electrodes 39 in FIG. 9 are each viewed as a circle in the plan view by increasing the number of corners 38a and 39a (for example, increasing the number of corners 38a and 39a to 20 or more). In the touch panel 42 and the liquid crystal display device 1 according to this embodiment, with the provision of the above configuration, portions in which the respective sides 38c of the holes 38b and the outer periphery $P_1$ of the pixels P, and the respective sides 39c of the dummy electrodes 39 and the outer periphery $P_1$ of the pixels P are lined up in parallel to each other can be minimized as compared with the touch panel or the liquid crystal display device with no provision of the above configuration. For that reason, the patterns of the detection electrodes 38 and the dummy electrodes 39 can be viewed, and the generation of moiré can be suppressed. The plural holes 38b of the detection electrodes 38 and the plural dummy electrodes 39 have only to be each shaped into the polygon having five or more corners in the plan view, and the number of corners may be different between the holes 38b of the detection electrodes 38 and the dummy electrodes 39. Also, in this case, the shapes S may be arranged and formed so that array pitches of the holes 38b and the dummy electrodes 39 are maintained.

Figure 10:
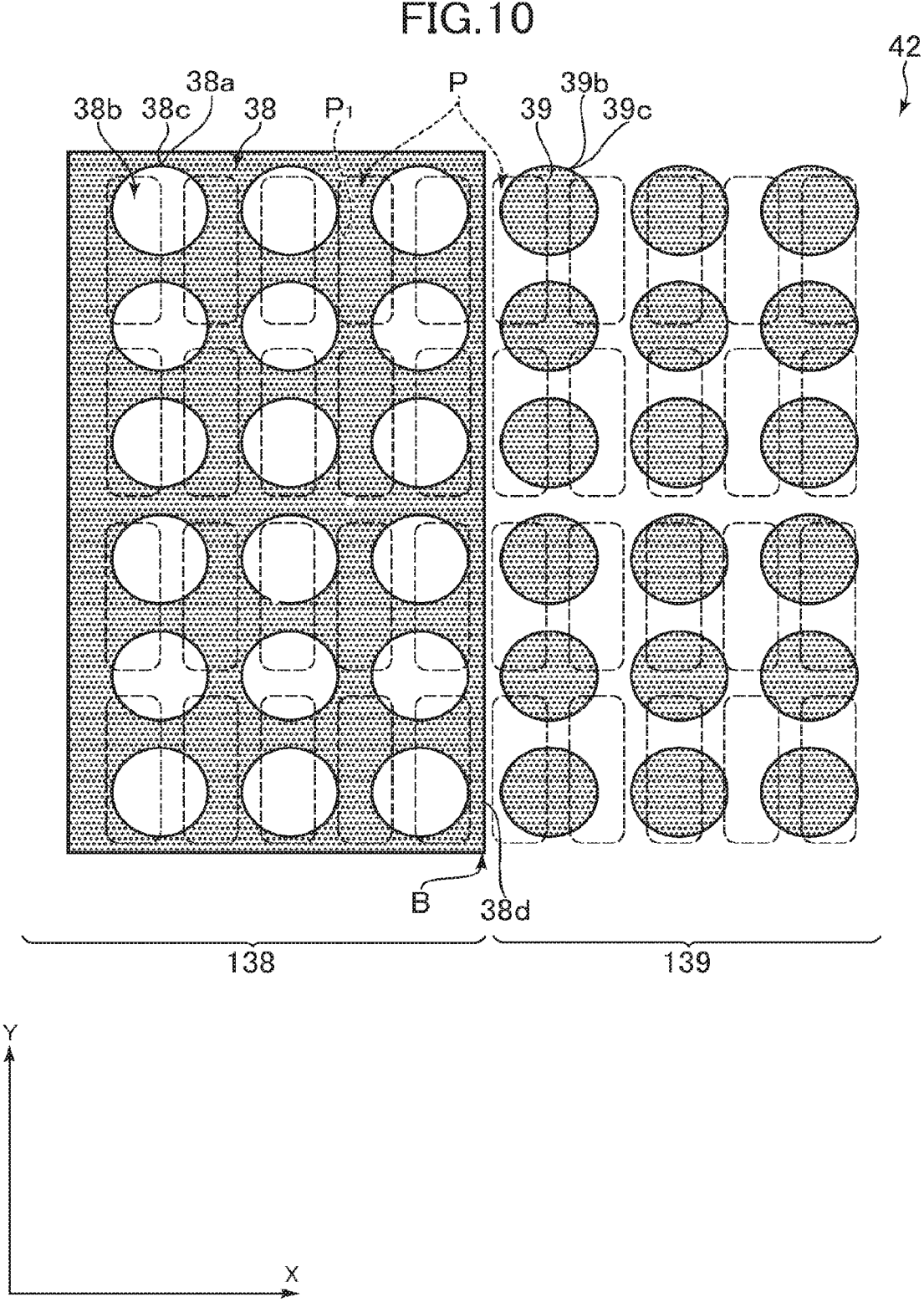
FIG. 10 is a partially enlarged view illustrating a still further modification of the touch panel according to this embodiment in the same viewing field as that in FIG. 4.

The array of the plural holes 38b of the detection electrodes 38, and the plural dummy electrodes 39 has been described above. The holes 38b and the dummy electrodes 39 may be arrayed except for in the zigzag array. FIG. 10 is a partially enlarged view illustrating a still further modification of the touch panel 42 according to this embodiment in the same viewing field as that in FIG. 4. As illustrated in FIG. 10, the holes 38b and the dummy electrodes 39 may not be arrayed in the closest manner.

Figure 12:
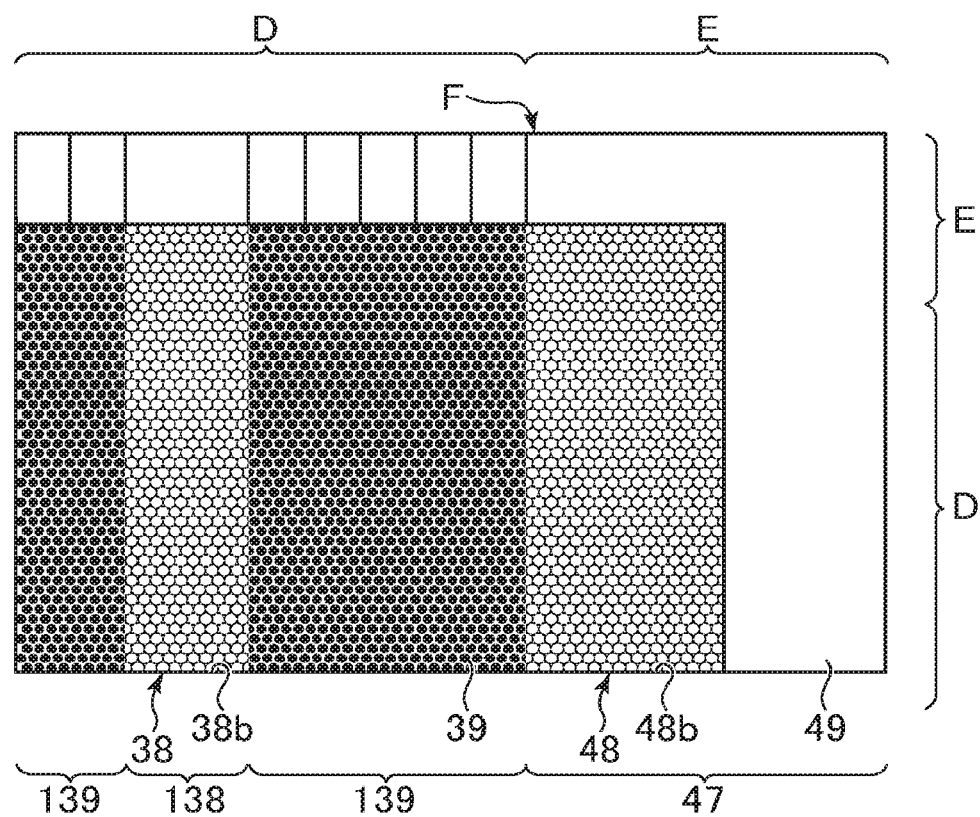
FIG. 12 is a partially enlarged view of an area XII in the touch panel illustrated in FIG. 1.

Subsequently, a configuration of the touch panel 42 in the non-display area E will be described in detail. FIG. 11 is a partially enlarged view of an area XI in the touch panel 42 illustrated in FIG. 1, and FIG. 12 is a partially enlarged view of an area XII in the touch panel 42 illustrated in FIG. 1.

In the non-display area E, a shield electrode 47 connected to the shield terminal 41 is formed to extend in the direction Y. The shield electrode 47 is an electrode configured to include a first area 48 which is an area of the display area D side, and a second area 49 which is an area outside of the first area 48. The first area 48 is formed along a boundary F between the display area D and the non-display area E. Also, the first area 48 is formed over the overall area corresponding to the non-display area E.

In the first area 48, as with the detection electrodes 38, holes 48b having the same shape as that of the holes 38b in the plan view are regularly formed. With this configuration, the first area 48 has the same shape as that of the detection electrodes 38 in the plan view.

In the touch panel 42 and the liquid crystal display device 1 according to this embodiment, the shield electrode 47 (the first area 48) having the plural holes 48b are formed along the boundary F in an area corresponding to the non-display area E of the touch panel 42. As a result, a shading difference within the non-display area E when the non-display area E is viewed from the outside of the touch panel 42 can be suppressed.

The embodiments of the present invention have been described above, but the present invention is not limited to the above-mentioned embodiments. For example, the configuration described in the above-mentioned embodiments may be replaced with a substantially identical configuration, a configuration having the same function effect, or a configuration that can achieve the identical purpose.

For example, in this embodiment, the touch panel 42 of the present invention is applied to the liquid crystal display device 1 of the in-cell system using the counter electrodes to which a voltage common to the plural pixels adjacent to each other in the direction X is applied as the scanning electrodes 30. Alternatively, the touch panel 42 of the present invention is not limited to the in-cell system, but can be applied to an on-cell system in which both of the scanning electrodes 30 and the detection electrodes 38 are formed over the second substrate 12, or a system in which a substrate on which the scanning electrodes and the detection electrodes are formed is put on the display device. Also, the touch panel 42 of the present invention may be applied to the display device (for example, an organic EL (electro luminescence) display device) other than the liquid crystal display device 1.

While there have been described what are at present considered to be certain embodiments of the invention, it will be understood that various modifications may be made thereto, and it is intended that the appended claims cover all such modifications as fall within the true spirit and scope of the invention.

What is claimed is:
1. A display device comprising:
a display panel;

a touch panel including a plurality of scanning electrodes and a plurality of detection electrodes that are formed to intersect with the plurality of scanning electrodes, a plurality of holes that are arrayed apart from each other on each of the plurality of detection electrodes, and shaped into polygons each shaped to have five or more corners in a plan view; and a plurality of dummy electrodes that are formed between the respective adjacent detection electrodes, made of the same material as that of the detection electrodes, and are arrayed apart from each other, wherein a surface shape of the plurality of dummy electrodes have the same polygonal shape as that of the holes of the plurality of detection electrodes, and the surface shape of the plurality of dummy electrodes is not the same as that of the plurality of detection electrodes.

2. The display device according to claim 1, wherein the plurality of holes shaped into the polygons and arrayed on the detection electrodes, and the plurality of dummy electrodes form a uniform contiguous array.

3. The display device according to claim 1, wherein the planar view shape of the polygons is viewed as a circle by increasing the number of corners.

4. The display device according to claim 1, wherein in a detection electrode formation area in which the detection electrodes are formed, a ratio of an area of the plurality of holes to an area of the detection electrodes is equal to or larger than ⅔ and equal to or smaller than 3/2.

5. The display device according to claim 1, wherein distances between centers of the respective adjacent polygons are equal to each other.

6. The display device according to claim 1, further comprising a shield electrode which is an electrode in which the plurality of holes shaped into the polygons are formed outside of a display area in which the detection electrodes are formed.

7. The display device according to claim 1, wherein the plurality of detection electrodes are formed on the display panel.

8. A display device comprising:
a display panel;
a touch panel including a plurality of scanning electrodes and a plurality of detection electrodes that are formed to intersect with the plurality of scanning electrodes;

a plurality of holes shaped that are arrayed apart from each other on each of the plurality of detection electrodes, and shaped into polygons each shaped to have five or more corners in a plan view; and a plurality of dummy electrodes that are formed between the respective adjacent detection electrodes, made of the same material as that of the detection electrodes, and are arrayed apart from each other, wherein a surface shape of the plurality of dummy electrodes are shaped into polygons each having five or more corners in a plan view, and the surface shape of the plurality of dummy electrodes is not the same as that of the plurality of detection electrodes.

9. The display device according to claim 8, wherein an area of the hole shaped on the detection electrodes is same as that of the dummy electrode.

10. The display device according to claim 8, wherein the plurality of holes shaped into the polygons and arrayed on the detection electrodes, and the plurality of dummy electrodes form a uniform contiguous array.

11. The display device according to claim 8, wherein in a detection electrode formation area in which the detection electrodes are formed, a ratio of an area of the plurality of holes to an area of the detection electrodes is equal to or larger than ⅔ and equal to or smaller than 3/2.

12. The display device according to claim 8, wherein distances between centers of the respective adjacent polygons are equal to each other.

13. The display device according to claim 8, further comprising a shield electrode which is an electrode in which the plurality of holes shaped into the polygons are formed outside of a display area in which the detection electrodes are formed.

14. The display device according to claim 8, wherein the plurality of detection electrodes are formed on the display panel.

* * * * *